US008384241B2

(12) United States Patent
Chen et al.

(10) Patent No.: US 8,384,241 B2
(45) Date of Patent: Feb. 26, 2013

(54) IN-WALL MULTI-VOLTAGE AC/DC DELIVERY SYSTEM WITH AC OUTLETS RECEPTACLES AND AT LEAST ONE USB POWER OUTLET

(75) Inventors: Henry Chen, City of Industry, CA (US); Jackson Chan, Diamond Bar, CA (US)

(73) Assignee: Ever Win International Corporation, City of Industry, CA (US)

( * ) Notice: Subject to any disclaimer, the term of this patent is extended or adjusted under 35 U.S.C. 154(b) by 251 days.

(21) Appl. No.: 12/409,724

(22) Filed: Mar. 24, 2009

(65) Prior Publication Data

US 2010/0246232 A1 Sep. 30, 2010

(51) Int. Cl.
*H02M 7/02* (2006.01)

(52) U.S. Cl. .......................................... 307/11; 363/146

(58) Field of Classification Search .................... 307/11; 363/146

See application file for complete search history.

(56) References Cited

U.S. PATENT DOCUMENTS 5,954,523 A 9/1999 Babcock
6,050,849 A * 4/2000 Chang ........................... 439/536
6,056,578 A * 5/2000 Lin ................................ 439/358
6,141,221 A * 10/2000 Tong et al. ..................... 361/724
6,210,216 B1 * 4/2001 Tso-Chin et al. ............. 439/545
6,211,581 B1 * 4/2001 Farrant .......................... 307/117
6,305,986 B1 * 10/2001 Hwang .................... 439/607.44
6,346,009 B1 * 2/2002 Lin .......................... 439/607.01
6,362,987 B1 3/2002 Yurek et al.
D465,769 S * 11/2002 Zhang et al. ................. D13/147
6,722,917 B2 * 4/2004 Huang ........................... 439/501
6,722,924 B1 * 4/2004 Zhou et al. ............... 439/607.23
6,736,677 B1 * 5/2004 Lin et al. .................. 439/607.28
D494,934 S * 8/2004 Milan ........................... D13/133
6,799,997 B2 * 10/2004 Lin et al. .................. 439/607.51
6,843,684 B2 * 1/2005 Milan ........................... 439/606
6,943,296 B2 * 9/2005 Perrella et al. .................. 174/66
7,140,922 B2 11/2006 Luu et al.
7,167,372 B2 * 1/2007 Mori et al. .................... 361/731
7,242,111 B2 7/2007 Menas et al.
D607,816 S * 1/2010 Chen et al. ................... D13/108
8,134,254 B2 * 3/2012 Makwinski ..................... 307/38
2003/0151938 A1 * 8/2003 Liao ............................. 363/146
2003/0220002 A1 * 11/2003 Chen ............................ 439/133
2004/0029444 A1 * 2/2004 Tang ............................ 439/607
2005/0088834 A1 * 4/2005 Milan ........................... 361/810
2006/0085584 A1 * 4/2006 Chen et al. .................... 710/303
2007/0015401 A1 * 1/2007 Sun ............................ 439/540.1
2007/0072476 A1 * 3/2007 Milan ........................... 439/373

(Continued)

FOREIGN PATENT DOCUMENTS

WO PCT/CN2008/001028 12/2008

OTHER PUBLICATIONS

U.S. Appl. No. 11/485,751, filed Jan. 17, 2008, Mimran.

(Continued)

*Primary Examiner* — Adi Amrany
(74) *Attorney, Agent, or Firm* — Joe Nieh

(57) ABSTRACT

A system of components pertaining to electrical wiring and adaptive, multipurpose outlets. A standardized and interchangeable in-wall system includes low voltage, direct-current power from an alternating current power source, compatible with existing AC outlet boxes. In a preferred embodiment, a standardized configuration of in-wall USB ports supplies low voltage, direct current, and includes a removable, interchangeable docking station. The invention allows for the charging of electronic devices while simultaneously preserving the availability of all AC outlets.

15 Claims, 8 Drawing Sheets

U.S. PATENT DOCUMENTS

| | | | | |
|---|---|---|---|---|
| 2007/0182363 | A1* | 8/2007 | Yang | 320/107 |
| 2007/0227755 | A1* | 10/2007 | Wu et al. | 174/67 |
| 2007/0247800 | A1* | 10/2007 | Smith et al. | 361/683 |
| 2008/0012423 | A1* | 1/2008 | Mimran | 307/11 |
| 2008/0122292 | A1* | 5/2008 | Minami | 307/44 |
| 2008/0258677 | A1* | 10/2008 | Lee | 320/101 |
| 2010/0075540 | A1* | 3/2010 | Liao | 439/638 |
| 2010/0213892 | A1* | 8/2010 | DeSanctis | 320/107 |
| 2010/0231161 | A1* | 9/2010 | Brown | 320/101 |
| 2011/0084660 | A1* | 4/2011 | McSweyn | 320/111 |
| 2011/0287665 | A1* | 11/2011 | Chien | 439/638 |
| 2011/0305056 | A1* | 12/2011 | Chien | 363/178 |
| 2012/0170342 | A1* | 7/2012 | Manning | 363/146 |
| 2012/0276763 | A1* | 11/2012 | Quezada | 439/108 |

OTHER PUBLICATIONS

U.S. Appl. No. 10/938,218, filed Apr. 28, 2005, Milan.

U.S. Appl. No. 11/601,361, filed May 22, 2008, Dorogusker et al.

U.S. Appl. No. 11/395,325, filed Dec. 7, 2006, Krieger et al.

Datapro International Inc.—DataPro USB Wall Plate-Single http://www.datapro.net/products/usb-wall-plate-single.html.

Datapro International Inc.—DataPro USB Wall Plate-Dual http://www.datapro.net/products/usb-wall-plate-dual.html.

Kramer Electronics USA, Inc.—Kramer Electronics Wall Plate Insert http://www.kramerelectronics.com/products/model.asp?pid=661&sf=132.

Meritline.com—Dual Port USB Wall Plate Coupler http://www.meritline.com/dual-port-usb-wall-plate-coupler-p-34620.aspx.

Fastmac Performance Upgrade, Inc.—TruePower, Power Outlet http://store.fastmac.com/product_info.php?products_id=458.

Cables to Go—CablesToGo USB Superbooster Wall Plate Kit http://www.cablestogo.com/product.asp?cat_id=1521&sku=29342.

Extron Electronics—Extron Wallplate with USB Connectors http://www.extron.com/product/product.aspx?id=wpb104&subtype=96&s=4.

Techorium Inc.—Decora VGA & USB Input Plate http://www.techorium.com/decora-vga-usb-input-plate-with-captive-screws-p-1060.html.

MCM Electronics—MCM Projector Wall Plate with USB http://www.mcmelectronics.com/product/DISTRIBUTED-BY-MCM-SG225-/832-2389.

CSN Stores LLC—Comprehensive Wallplate with USB http://www.allbarstools.com/Comprehensive-WP-1760-E-P-AC-CH1631.html.

Vetco Electronics—HDMI + VGA Female + USB Wall Plate http://shop.vetcosurplus.com/catatog/product_info.php?products_id=8949&osCsid=7a3a0728078c204b237b28ebf2c5ce44.

* cited by examiner

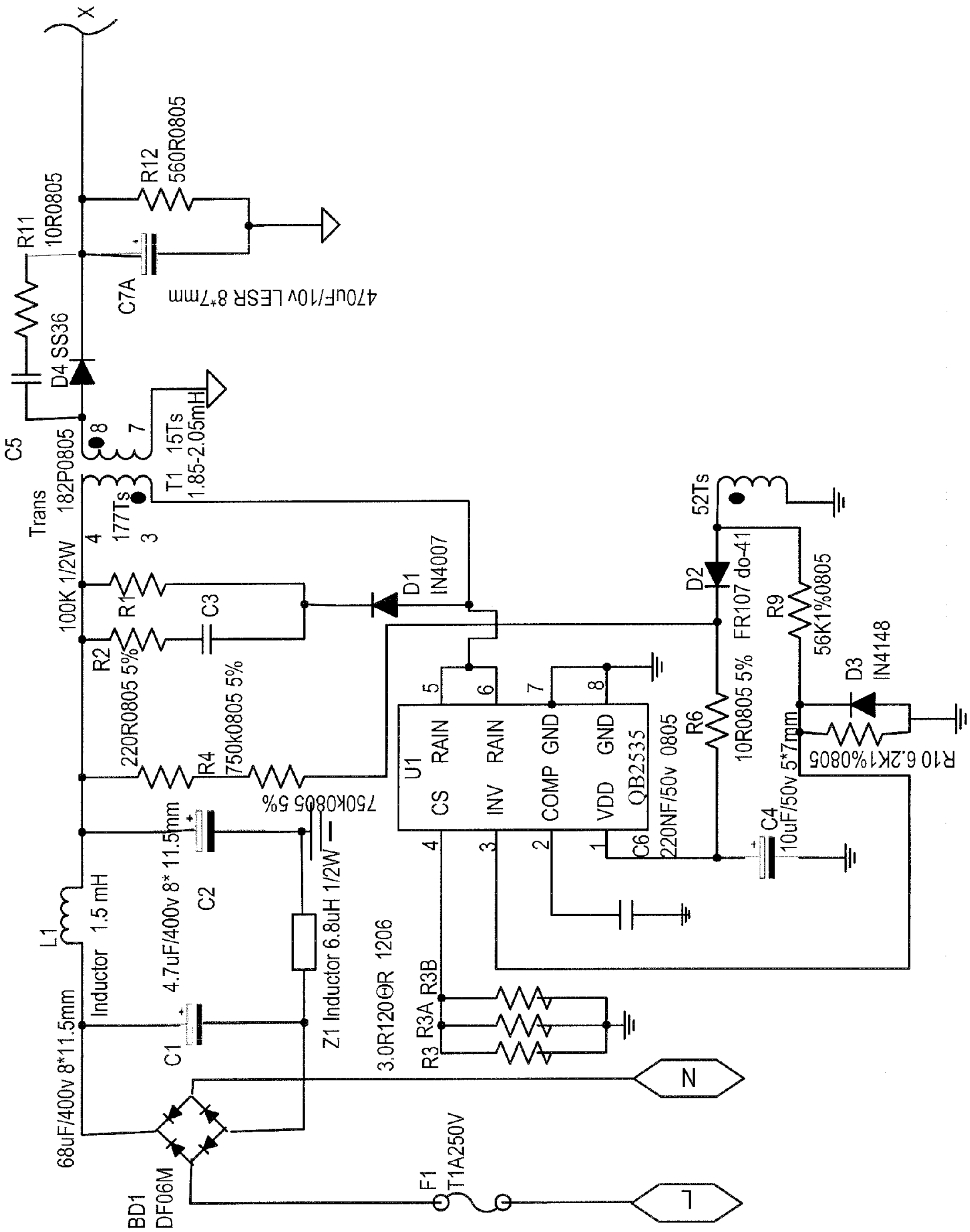
Figurer 6A

IN-WALL MULTI-VOLTAGE AC/DC DELIVERY SYSTEM WITH AC OUTLETS RECEPTACLES AND AT LEAST ONE USB POWER OUTLET

BACKGROUND AND PRIOR ART

In recent years, portable electronic and electrical devices have proliferated. Smart phones, portable media players, digital cameras and micro-laptops or netbooks are already ubiquitous and appear likely to continue to increase in popularity. A significant and increasing proportion of the population of these devices run on rechargeable batteries in one form or another. Hence, there is a need for a standardized interface for supplying power to devices for the purpose of recharging portable power subsystems, including batteries.

Although portable electronics themselves are typically small, lightweight and convenient, they are often come with relatively bulky, heavy chargers; necessarily so by virtue of step-down transformers and other components required to render higher-voltage, alternating current into usable, lower-voltage direct current. Moreover, the interface receptacles for device chargers and adapters are currently not standardized and vary widely. As such, consumers inevitably acquire numerous chargers and adapters associated with different electronic devices. Along with them comes the attendant clutter and inconvenience of storing the chargers, as well as the organizational challenge of determining which charger is associated with which device. Hence it is desirable: (1) to achieve a standardized means for charging portable electronic devices; (2) to create an infrastructure for supplying direct current at a usable voltage to that means; and (3) to eliminate excessive and unnecessary apparatus. Moreover, to the extent that an invention achieves these goals and becomes widely incorporated into the power delivery infrastructure, the need for separate portable electronic device chargers will be greatly diminished.

Various efforts have been made to provide in-wall, low-voltage direct current receptacles in connection with standard alternating current power outlets. For instance, published patent application U.S. 2008/0012423 by Mimran, et al., discloses an in-wall USB adaptor with a multitude of ports, and including a built-in transformer for reducing the delivered voltage, to be used as a replacement wall outlet for the purpose of providing low voltage DC current from a standard AC power supply. Similarly, U.S. Pat. No. 6,362,987 to Yurek, et al., discloses and claims an outlet receptacle for wiring to an AC power supply, and which includes a step-down transformer, an AC/DC converter and a female receptacle for receiving a male insert for the purpose of recharging batteries or portable electronic devices. Yurek '987 specifically discloses a cigarette lighter adapter insert/receptacle. In another instance, U.S. Pat. No. 6,943,296 to Perrella discloses a modified outlet face-plate which incorporates USB portals, but eliminates standard AC outlets entirely.

However, none of these attempts successfully constitutes a full solution to the need for an in-wall outlet system that provides simultaneous access to both alternating current outlets, bundled with low voltage direct current outlets, in a standardized, convenient configuration, allowing for similarly standardized docking stations and/or charging cradles optionally coupled to those direct current outlets.

SUMMARY OF THE INVENTION AND INDUSTRIAL APPLICATION

The instant invention pertains to electrical wiring and adaptive outlets, and includes a standardized and interchangeable in-wall system for providing low voltage, direct-current power from an alternating current power source, compatible with existing AC outlet boxes. In a preferred embodiment, the inventive concept includes not only a standardized configuration of in-wall USB ports supplying low voltage, direct current power, but also a removable, interchangeable docking station, thereby allowing for the charging of electronic devices while simultaneously preserving the availability of both AC outlets.

DETAILED DESCRIPTION AND BEST MODE

In its preferred embodiment, the present inventive concept pertains to an in-wall outlet system and associated docking station/charging cradle. The preferred embodiment couples low-voltage direct-current outlets in a standardized configuration present in an alternating current, household-style outlet. Standardized direct current outlets couple to an optionally attachable/detachable structure with a charging port for portable electronic devices.

Figure 1:
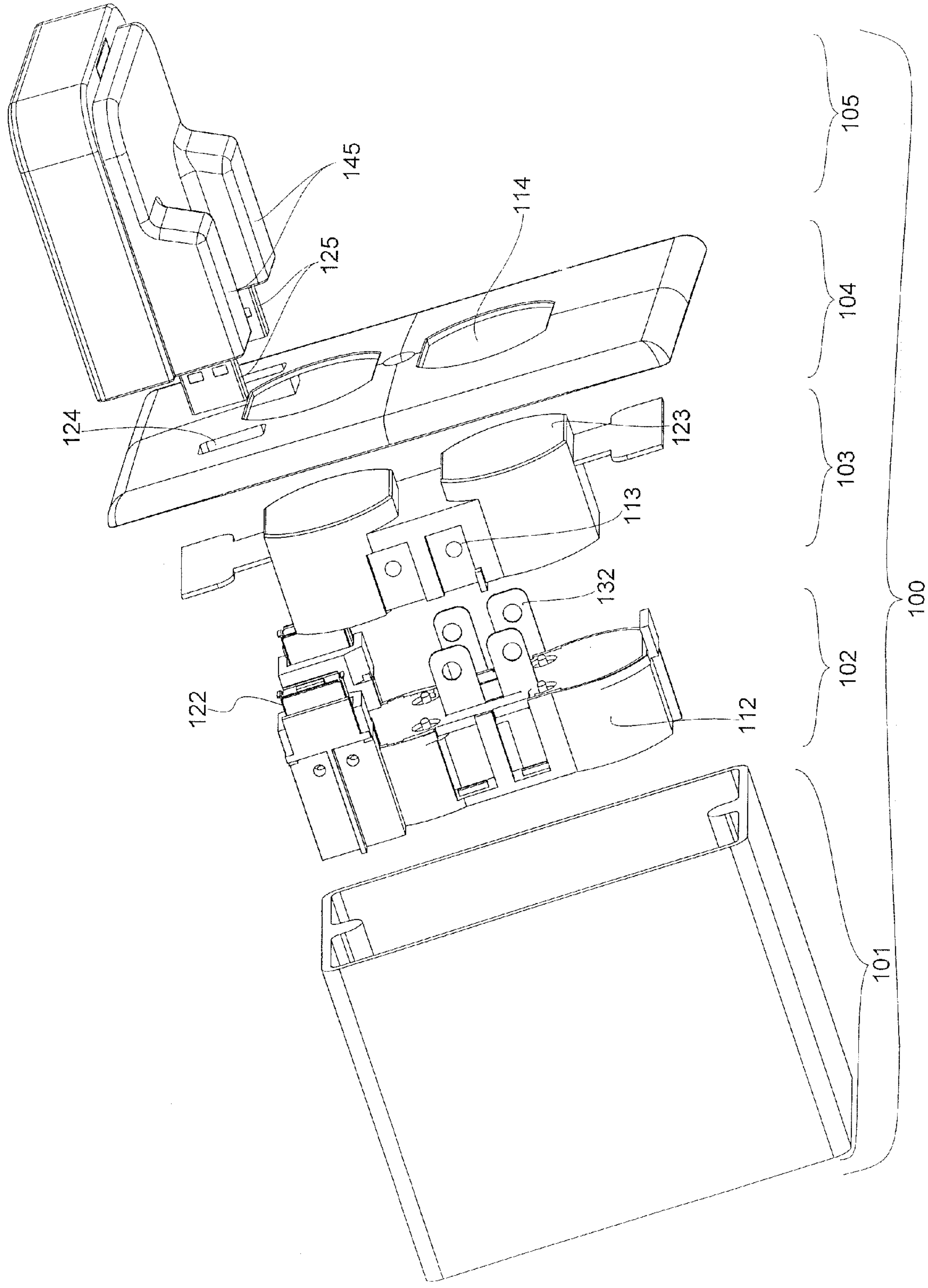
FIG. 1 shows a perspective, exploded view of a preferred embodiment of the system of the present invention.
Figure 2:
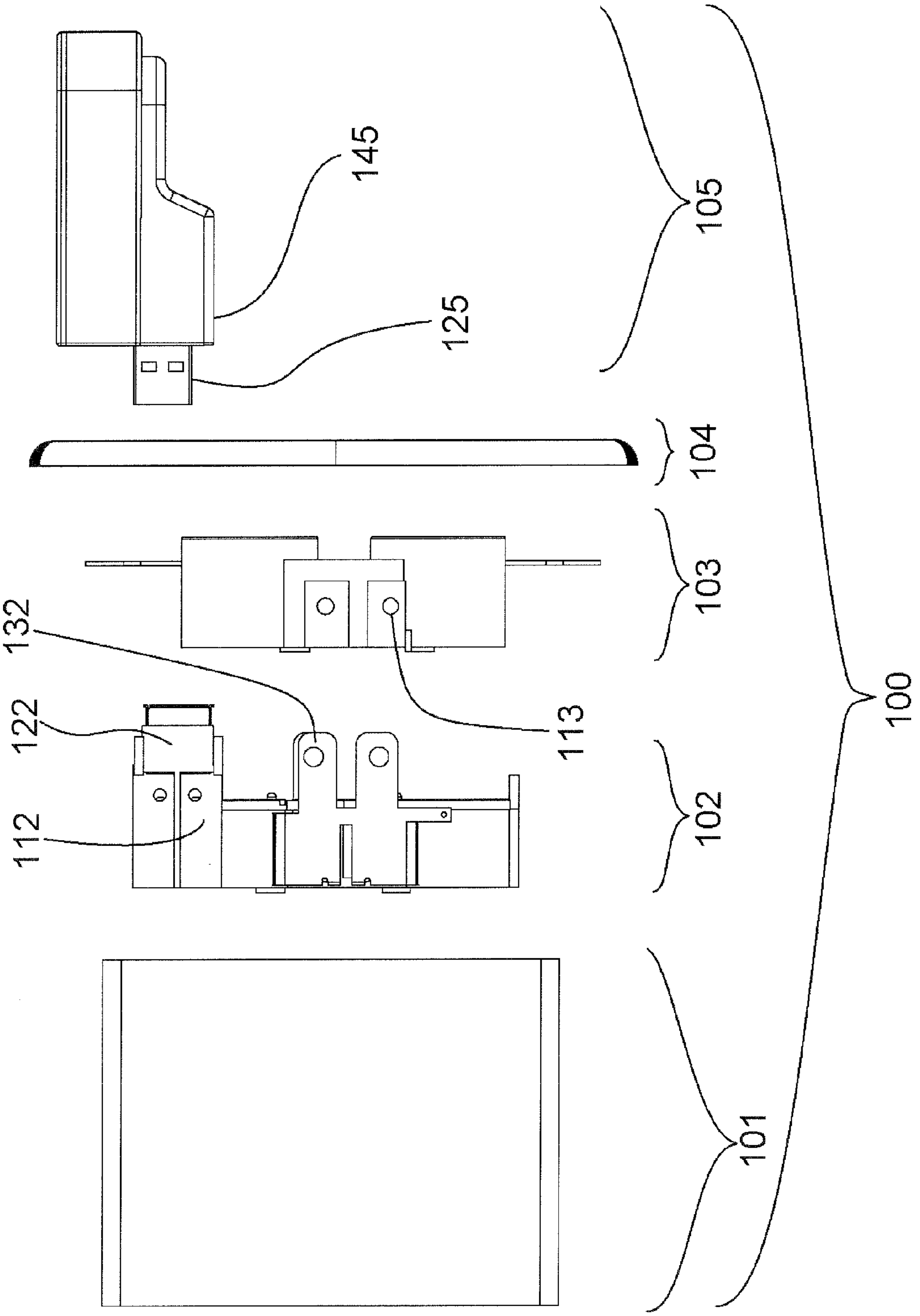
FIG. 2 shows a lateral, exploded view of a preferred embodiment of the system of the present invention.

According to a preferred embodiment of the invention, FIG. 1 shows and in-wall system 100, which includes junction box 101, direct current adapter module 102, alternating current outlet assembly 103, faceplate 104 and docking station 105. In one embodiment, the system, including junction box 101, can be installed as an in-wall outlet during new construction or as a replacement for existing outlets. In an alternative embodiment, this system of components can be retro-fitted into an existing in-wall junction box, omitting junction box 101.

Figure 6B:
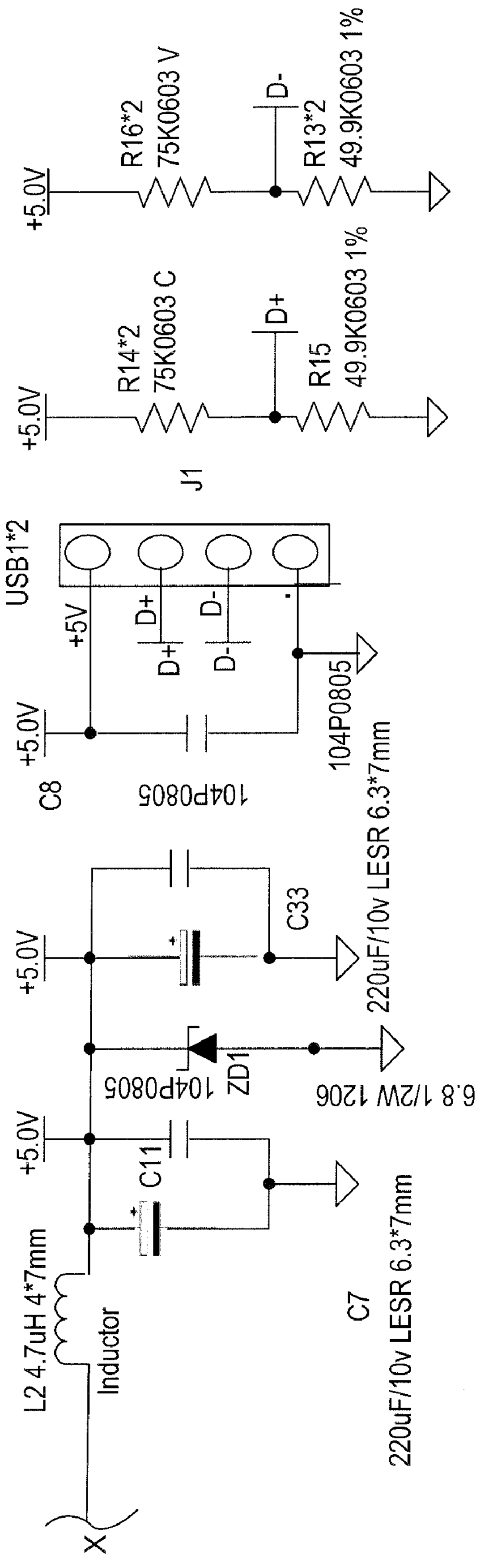
FIG. 6 is a circuit diagram of the system of FIG. 1.

Direct current adapter module 102 comprises a power source converter contained in housing 112, USB power outlets 122, and connector tabs 132. In preferred embodiments, housing 112 contains circuitry for converting alternating current to direct current and reducing the voltage supply such that the voltage at each USB power outlet is approximately 5 volts. A preferred embodiment of said circuitry is disclosed in FIG. 6. In alternative embodiments, noise filters and surge protection circuitry may also be included. In alternative embodiments, connector tabs 132 can similarly be conductive prongs or other functionally equivalent means for coupling to alternating current outlet assembly 103, for instance, at power terminals 113 or otherwise.

Figure 3:
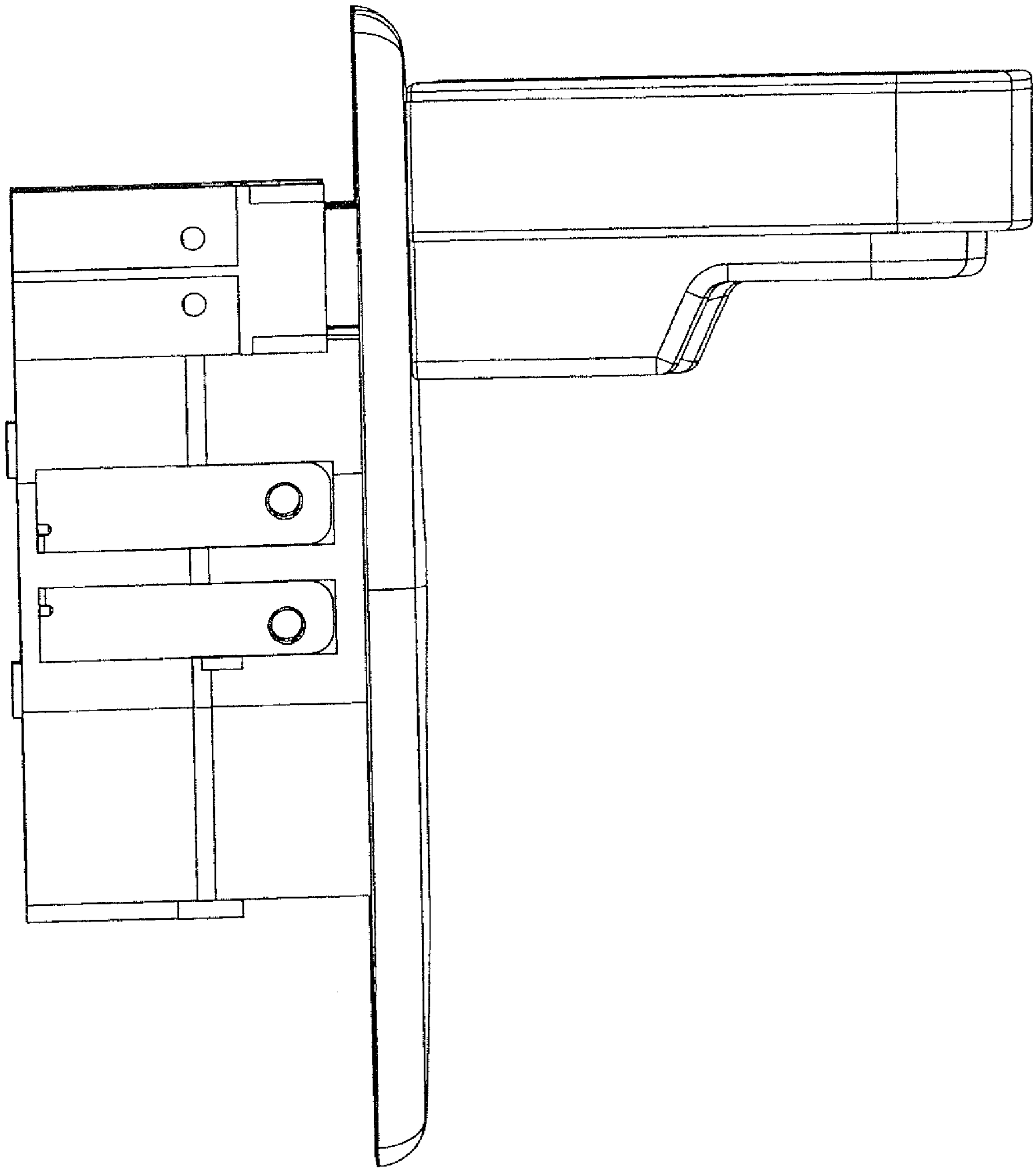
FIG. 3 shows a lateral, assembled view of a preferred embodiment of the system of the present invention.
Figure 4:
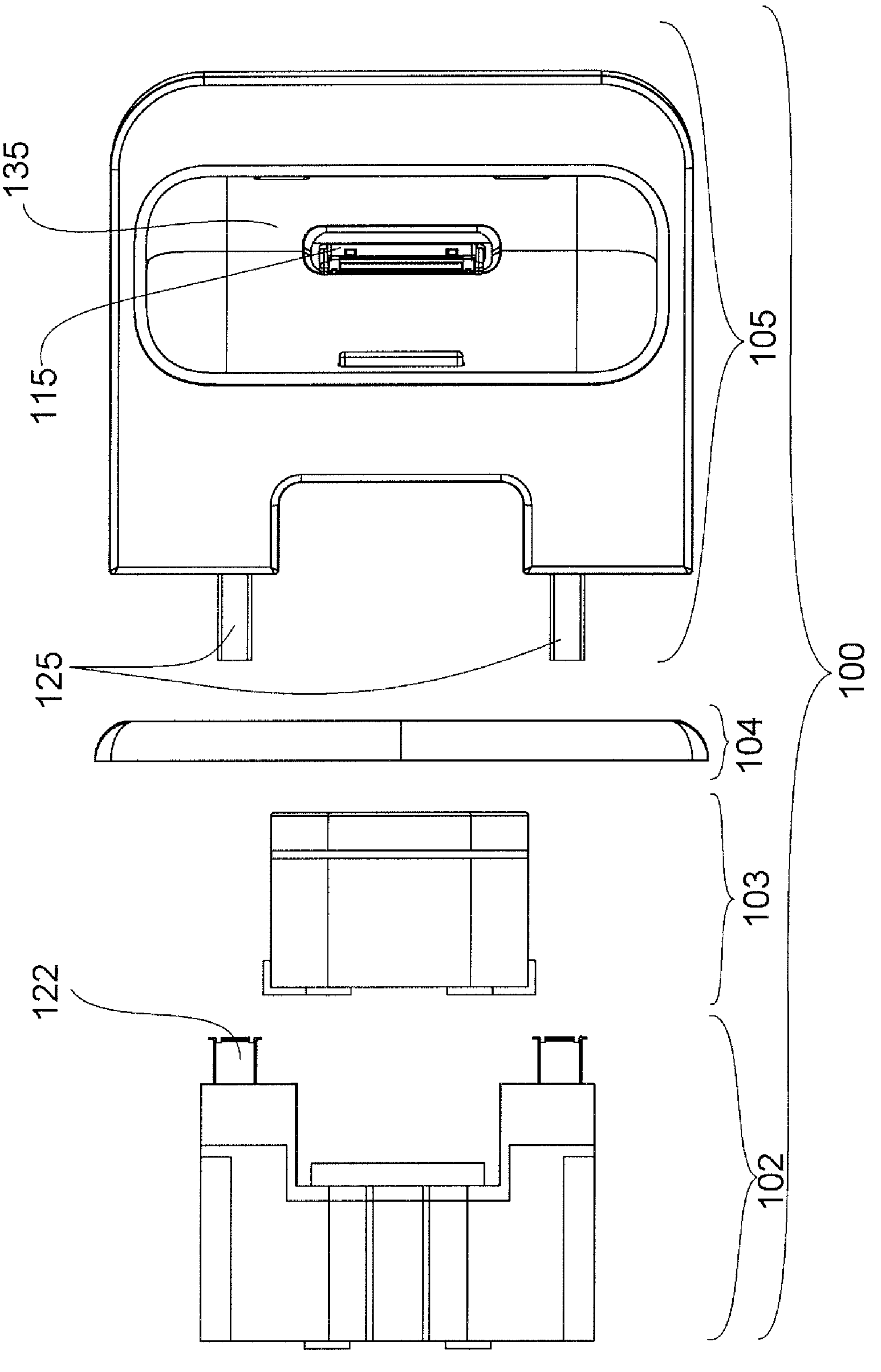
FIG. 4 shows an overhead, exploded view of a preferred embodiment of the system of the present invention.
Figure 5:
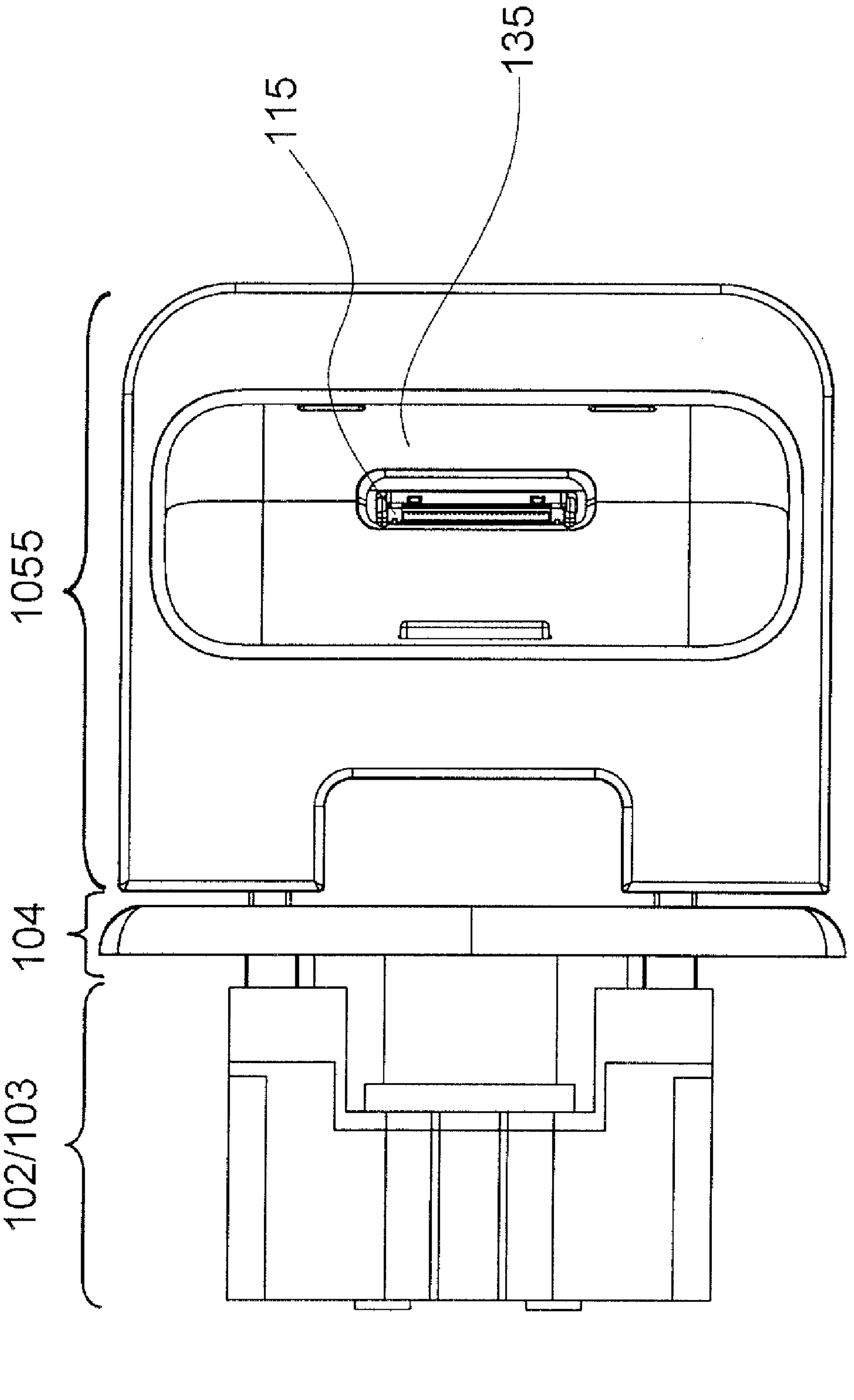
FIG. 5 shows an overhead, assembled view of a preferred embodiment of the system of the present invention.

Alternating current outlet assembly 103 includes power terminals 113 and outlets 123. In a preferred embodiment, outlets 123 have standard receptacles for male plug inserts (not shown). Assembly 103 couples with adapter module 102 in a piggy-back manner as shown in FIGS. 3 and 5 from lateral and overhead views, respectively. In a preferred embodiment, coupled adapter module and outlet assembly are enclosed by junction box 101.

In a preferred embodiment, faceplate 104 mounts to and covers outlet assembly 103 and adapter module 102, with USB power outlets 122 and alternating current outlets 123 protruding through respective openings 124 and 114, as shown in FIGS. 1-5. Faceplate 104 can be oriented such that USB power outlets 122 and respective openings 124 are either above or below alternating current outlets 123 and respective openings 114.

Figure 7:
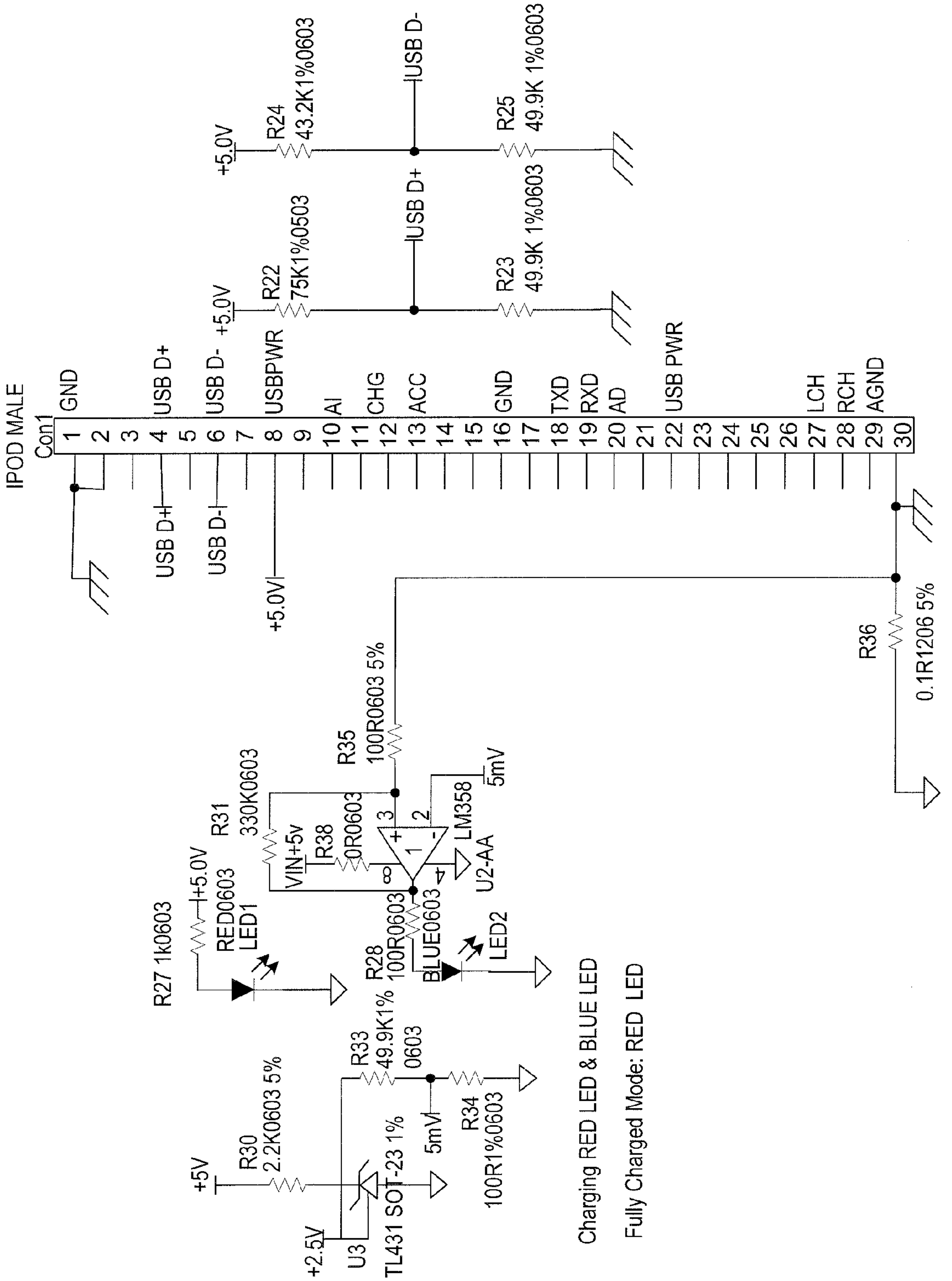
FIG. 7 is a circuit diagram of the USB docking charger of the system of FIG. 1.

In a preferred embodiment, docking-station 105 optionally couples to USB outlet ports 122 by means of USB insert ports 125, and provides a shelf-type structure for charging portable electronic devices. Charging port 115 constitutes a means for coupling to the charging receptacle of an electronic device. One possible embodiment of the circuitry of docking-station 105 is disclosed in FIG. 7. In an alternative preferred embodiment, docking station 105 may include a contoured surface like cradle 135 thereby providing a structure in which a portable electronic device can rest securely while being charged. In a most preferred embodiment, docking station 105 can be engaged while simultaneously allowing both alternating current outlets available by virtue of coupling legs 145, which straddle upper alternating current outlet 123. Allowing for optional, simultaneous use of docking station 105 and alternating current outlets is a primary objective of the inventive concept. Consequently, other functionally equivalent solutions, apparent to one skilled in the art, are intended to be included in the claimed invention.

Information as herein shown and described in detail is fully capable of attaining the above-described object of the invention, the presently preferred embodiments of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural, electrical, and functional equivalents to the elements of the above-described preferred embodiment and additional embodiments that are known to those of ordinary skill in the art are expressly incorporated herein by reference and are intended to be encompassed by the present claims.

Moreover, it is not necessary for a device or method to address each and every problem sought to be solved by the present invention for it to be encompassed by the present claims. Furthermore, no element, component or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

We claim:

1. A system for providing alternating current and direct current outlets from an alternating current power-line, comprising:

a junction box disposed within a wall;

an alternating current outlet assembly, having at least two outlet receptacles, disposed within said junction box;

a direct current adapter module, disposed within said junction box, coupled to said alternating current outlet assembly, having a step-down transformer, an alternating current/direct current converter, and two USB power outlets, wherein said two USB power outlets are disposed with one on either side of one of said outlet receptacles separated by a pre-selected distance that corresponds to an optional detachable docking-station with two USB-compatible coupling inserts fixed at said pre-selected distance, and a detachable docking-station optionally coupled to said USB power outlets via USB-compatible coupling inserts and having a port for coupling to and charging a portable electronic device.

2. The system of claim 1, further comprising a faceplate, detachably mounted to said alternating current outlet assembly, having two or more openings for said alternating current outlets and two openings for said USB power outlets.

3. The system of claim 2 wherein said direct current adapter module has at least two USB power outlets and said faceplate has at least two corresponding USB outlet openings.

4. The system of claim 3 wherein the centers of said USB power outlets and said faceplate's corresponding USB power outlet openings are horizontally separated by a pre-selected distance.

5. The system of claim 3 wherein the centers of said USB power outlets and said faceplate's corresponding USB power outlet openings are horizontally separated by a distance selected from the range between 2.5 and 5 cm.

6. The system of claim 3 wherein the centers of said USB power outlets and said faceplate's corresponding USB power outlet openings are horizontally separated by a distance of approximately 4.3 cm.

7. The system of claim 1 wherein the detachable docking station has at least two USB-compatible coupling inserts.

8. The system of claim 1 wherein the centers of the docking station's USB-compatible coupling inserts are horizontally separated by a pre-selected distance.

9. The system of claim 1 wherein the centers of the docking station's USB-compatible coupling inserts are horizontally separated by a distance selected from the range between 2.5 and 5 cm.

10. The system of claim 1 wherein the centers of the docking station's USB-compatible coupling inserts are horizontally separated by a distance of approximately 4.3 cm.

11. The system of claim 1 wherein said docking station is shaped such that all said alternating current outlets remain available for simultaneous use when said docking station is coupled to said USB power outlets.

12. The system of claim 1 wherein said docking station provides low-voltage direct current and having at least two USB-compatible inserts capable of coupling to USB compatible wall outlets and extend outwardly perpendicular to the wall outlets without interfering with the use of any other outlets in said wall outlets when it is coupled to the USB compatible wall outlets wherein said USB-compatible inserts are positioned with one on either side of said outlets and further having a port for coupling to and charging electronic devices.

13. The docking station of claim 12 wherein the centers of said USB-compatible inserts are horizontally separated by a pre-selected distance.

14. The docking station of claim 12 wherein the centers of said USB-compatible inserts are horizontally separated by a distance selected from the range between 2.5 and 5 cm.

15. The docking station of claim 12 wherein the centers of said USB-compatible inserts are horizontally separated by a distance of approximately 4.3 cm.

* * * * *